March 14, 1967   J. S. STRANCE ETAL   3,309,043
RAPID CYCLE ARRESTING SYSTEM

Filed March 22, 1965   3 Sheets-Sheet 1

INVENTORS.
JOHN S. STRANCE
ROBERT W. CRUGER
BY
Tilberry & Body
ATTORNEYS

INVENTORS.
JOHN S. STRANCE
BY ROBERT W. CRUGER

Tilberry & Body
ATTORNEYS

March 14, 1967   J. S. STRANCE ETAL   3,309,043
RAPID CYCLE ARRESTING SYSTEM
Filed March 22, 1965   3 Sheets-Sheet 3

INVENTORS.
JOHN S. STRANCE
ROBERT W. CRUGER
BY
*Tilberry & Body*
ATTORNEYS

United States Patent Office 3,309,043
Patented Mar. 14, 1967

3,309,043
RAPID CYCLE ARRESTING SYSTEM
John S. Strance, Drexel Hill, and Robert W. Cruger,
Springfield, Pa., assignors to E. W. Bliss Company,
Canton, Ohio, a corporation of Delaware
Filed Mar. 22, 1965, Ser. No. 441,560
8 Claims. (Cl. 244—110)

This invention pertains to the art of aircraft arresting devices and more particularly to energy absorbing engines, employed to assist aircraft in making landings on short runways.

The general scheme for arresting the forward speed of an aircraft making a landing on a short airstrip, the deck of an aircraft carrier, or the like, is to provide a pendant which is placed transversely across the glide path of the plane which is intercepted by a tail hook on the plane. The opposite ends of the pendant are secured to arresting engines each having a purchase tape system which is payed out at a rate to provide a predetermined resistance to the aircraft's forward motion and at a magnitude sufficient to bring the aircraft to a stop within the required distance in a safe and gradual manner.

The arresting engine may employ a rotary friction brake as the energy absorbing means for retarding rotation of a pendant payout reel upon which the purchase tape is wound. The brakes are hydraulically actuated by means of a gear pump driven by the reel shaft so as to retard rotation of the reel in a programmed fashion during the arrestment period.

A hydraulic brake system for accomplishing this is described in United States Patent No. 3,142,458, issued July 28, 1964.

Basically the hydraulic brake system includes a variable orifice valve which controls the output of a gear pump so that the breaking pressure is modulated to provide a programmed arrestment of the aircraft.

One of the problems with the rotary friction gear is the tremendous amount of heat generated by the real brakes during arrestment inasmuch as it is necessary to transfer the kinetic energy of the aircraft into heat energy. The heat energy must be dissipated between arrestment periods. Heat is primarily a problem due to the fact that it prevents a rapid succession of arrestments which is desirable. Thus, the number of arrestments per unit of time is largely dependent on the efficiency of the brake cooling system. It is normal practice to cool the reel brakes by a water spray during the recycle period when the pendant is being restored to the battery position after arrestment, however, this allows the brakes to overheat during the arresting portion of the cycle. As a result, an extended recycle period is required to satisfactorily cool the brakes.

Another problem arises from the need to arrest heavier aircraft in shorter spaces. Characteristically, the braking capacity is increased by increasing the number of rotary friction elements attached to the reel, however, as a practical matter, this technique alone is unsatisfactory to increase the braking energy since the frictional force drops off rapidly away from the point of application of the braking force.

It is a purpose of this invention to overcome these difficulties, and others, by providing a rapid cycle arresting engine comprising a pendant payout reel, a mounting drum rotatably supporting the pendant payout reel in radially spaced relationship so as to define an annular brake chamber therebetween, rotary sealing means between the reel and drum for sealing the brake chamber, a rotary friction brake housed within the brake chamber operable for retarding rotation of the pendant payout reel, and a cooling system for circulating a coolant through the brake chamber to dissipate the heat developed by the brake while arresting the forward motion of an aircraft.

Further in accordance with the invention, the rotary friction brake comprises a plurality of stator members attached to the drum and a plurality of rotary members attached to the reel, the members being radially interleaved with each other and fluid brake operator means disposed on opposite sides of the interleaved members for urging them into rotary braking engagement so that the braking forces are opposing and equal, producing a neutral zone in the middle.

Further in accordance with the invention, a divider ring is attached to the drum and extends radially between the interleaved members at the neutral zone, the arrangement being such that the interleaved members are separated into modules containing an equal number of rotors and stators.

In accordance with another aspect of the invention, the reel is mounted for rotation on a vertical axis and the coolant fills the brake chamber submerging the brake, the arrangement being such that rotation of the reel circulates the coolant upwardly through the brake under the influence of the centrifugal force of the rotating reel.

A principal object of the invention is the provision of an aircraft arresting engine having increased torque and energy capacity capable of stopping heavier aircraft at higher speeds and over shorter distances.

Another object is to provide an aircraft arresting engine capable of making more arrestments per given unit of time than has heretofore been thought possible.

Another object is to provide an aircraft arresting engine employing friction brake energy absorbing means having increased brake life resulting from a recirculating brake cooling system.

Other objects of the invention will become apparent from a reading of the specification taken in consideration with the drawings wherein.

Figure 1:
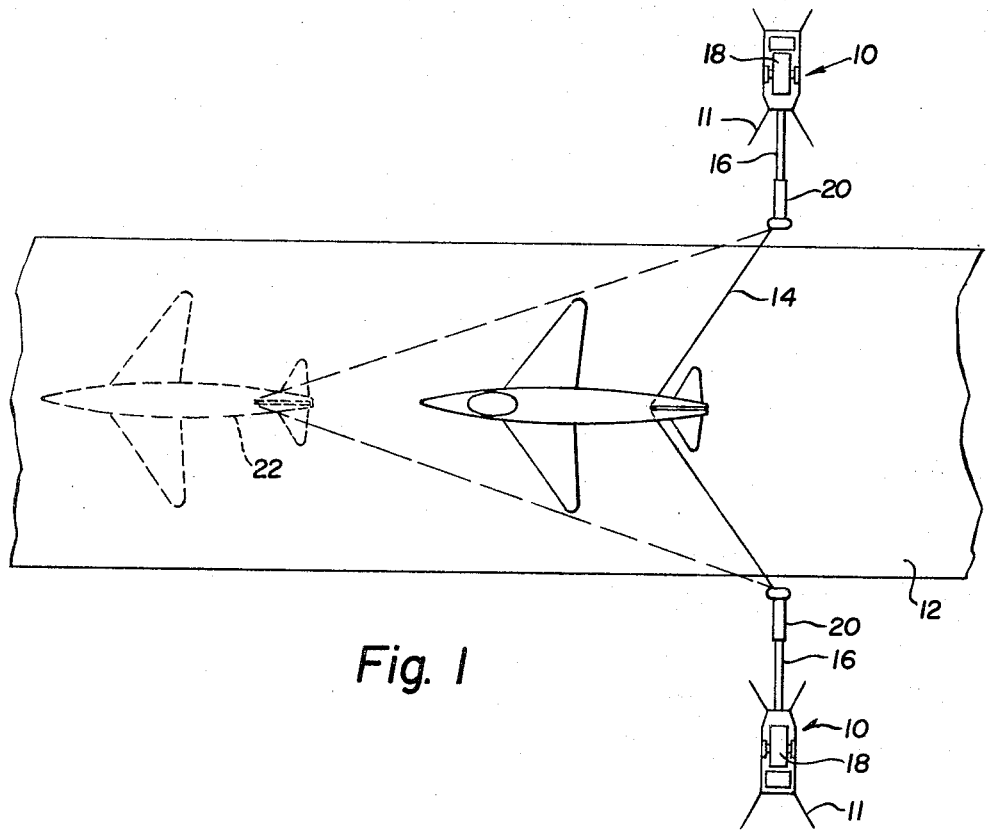
FIGURE 1 is a perspective view of an expeditionary installation of the invention shown in association with an aircraft in the process of being arrested.

Referring now to the drawings wherein the showings are for the purpose of illustrating preferred embodiments of the invention only and are not for the purpose of limiting same, FIGURE 1 shows an above ground, expeditionary type of installation where a rotary friction arresting engine 10, constructed in accordance with the invention, is secured by anchors 11 on each side of an airstrip 12. A pendant 14, usually in the form of a steel cable, is stretched across the airstrip 12 and is connected at its opposite ends to a nylon purchase tape 16 wound spool-fashion on reels 18 of each arresting engine 10. When the tail hook of the aircraft engages the pendant 14 at its battery position, the tape 16 is payed out through tape ducts and guide blocks 20 to bring the aircraft to rest at the runout position 22 exaggeratively foreshortened as depicted by the dot-dash lines. After arrestment, the pendant 14 is detached from the aircraft and the retraction motors 23 of each arresting engine 10 are clutched into recycle the reels 18 and rewind the purchase tape bringing the pendant 14 back to the battery position ready for the next engagement.

Figure 3:
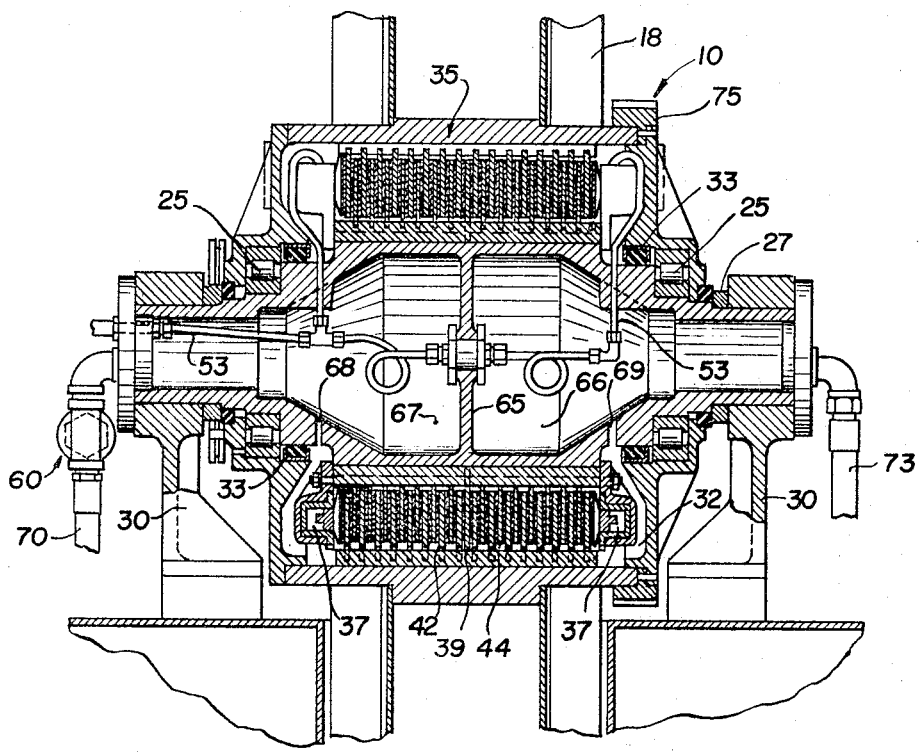
FIGURE 3 is a cross-sectional view taken at the rotational axis of the payout pendant reel showing the rotary friction brake constructed in accordance with the invention.
Figure 4:
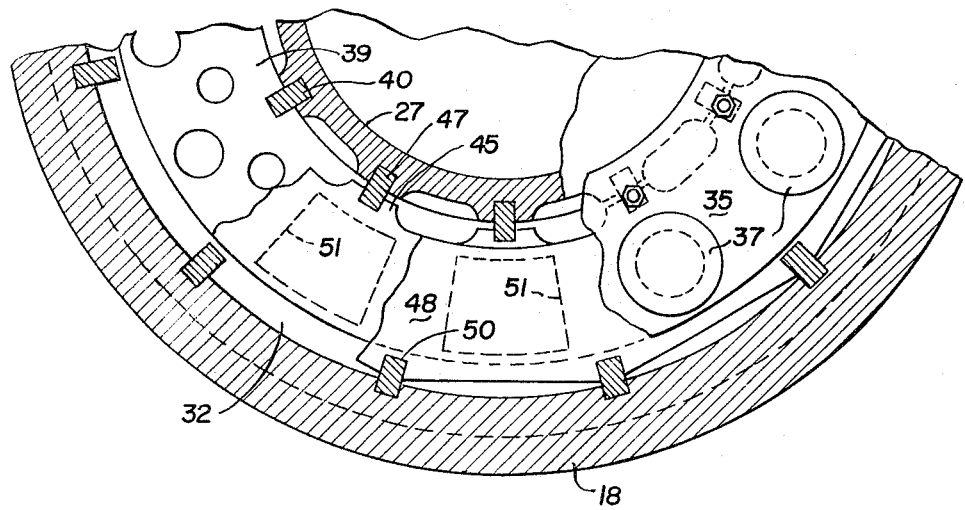
FIGURE 4 is a partial sectional view showing the stator brake members and rotary brake members broken away to illustrate the interleaved relationship thereof.
Figure 5:
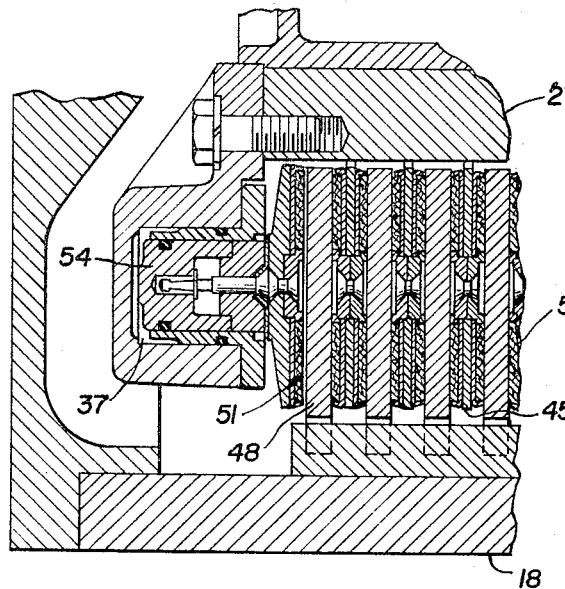
FIGURE 5 is a partial sectional view showing one of the brake actuators of the rotary friction brake.

Referring now to FIGURES 3–5, the reel 18 is rotatably mounted at 25 upon a stationary drum 27 supported at each end by pillow blocks 30. The reel 18 is radially spaced from the drum 27 to define a brake chamber 32 sealed at opposite ends by rotary seals 33. A rotary friction brake 35 is mounted within the brake chamber 32 and comprises end plates, each rigidly mounted on an opposite end of the drum 27 and each housing an annular array of hydraulic brake actuators 37 arranged in diametrically opposed relationship. Between the end plates is a fixed ring 39 keyed to the drum 27 at 40. Between the ring 39 and each end plate are a plurality of brake stator members 45 guided in keyways 47 on the drum 27 and rotary brake members 48 attached to the reel 18 by keyways 50. The stators 45 and rotors 48 are radially interleaved and axially spaced across the brake chamber 32 to provide clearance for brakepads 51 attached to the stators 45. Brakepads 51 are riveted on the stators 45 in circumferentially spaced alignment with the hydraulic actuators 37. Adjusting screws and shims may be provided in a known manner to adjust the stators 45 and rotors 48 to provide sufficient clearance so that the reel 18 is relatively free to turn when the brake is off. An hydraulic system (not shown) is provided for operating the brakes which may be of the type described in the aforementioned United States Patent No. 3,142,458. In that system, the braking pressure is applied with a force which is proportional to the speed of rotation of the reel 18. Briefly, the braking system described in the aforementioned patent includes a variable orifice valve which controls the output of a gear pump so that the braking pressure is modulated to provide a programmed arrestment of the aircraft. The details of the hydraulic system form no part of the present invention and only so much of the hydraulic piping 53 of the system is shown to indicate the maner of delivering hydraulic fluid to the brake actuators 37.

Referring now particularly to FIGURE 5, a sectional view of one of the hydraulic actuators 37 is shown in which a piston 54 moves axially under the influence of the hydraulic pressure delivered by the line 53. It should be understood that each actuator 37 at each end of the brake is at the same pressure as controlled by the hydraulic system. It is thus important to note that the braking forces are opposing and equal producing a neutral zone at the location of divider ring 39. The divider ring 39 may therefore be merely a lightweight steel plate since it takes practically no axial loading from the brake modules on either side. As a result of this arrangement, the braking energy of the rotors 48 in each module most remote from the actuators 37 is greatly increased. The opposed relationship of the actuators 37 squeezes the rotors 48 from two sides and develops a much greater braking energy on the center rotors than would otherwise be possible if the actuators 37 were, for example, situated at only one end of the brake and acted on a single brake module against a stationary brake ring. Thus the invention permits the use of a greater number of rotors than prior art brakes since the braking energy of the remote rotors is not reduced excessively by stacking. For example, in prior reel brakes the number of rotors considered useful was about six while in the present invention there are eight rotors in each braking module for a total of sixteen. Obviously by increasing the number of brake modules the braking energy can be further increased. By way of example, with the two modules of the preferred embodiment a 56,000 pounds aircraft may be brought to a gradual stop in a maximum runout of about 650 feet.

Further in accordance with the invention, the divider ring 39 maintains the brake modules separated and minimizes the tendency for the rotors to shift laterally to the right or left.

Figure 2:
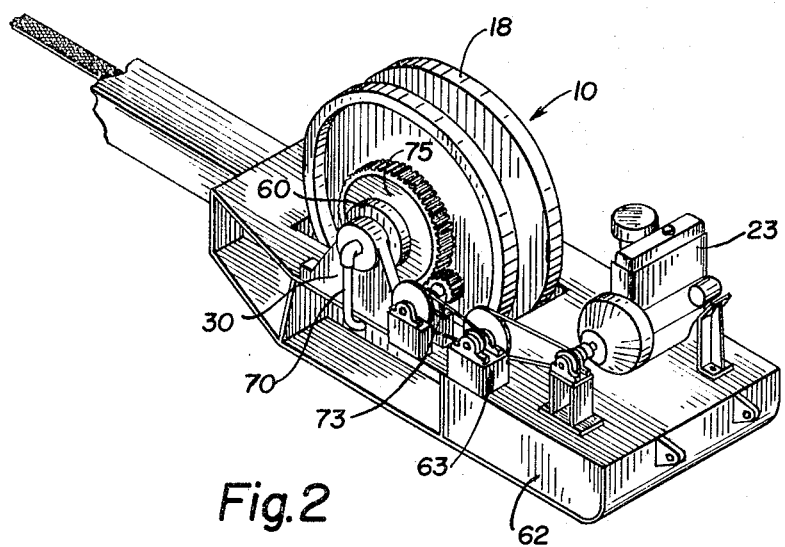
FIGURE 2 is a view showing the arresting engine of FIGURE 1 in closer perspective.

In order to increase the brake life and most importantly provide rapid recycling, the present invention incorporates a cooling system generally indicated by the numeral 60 in FIGURES 2 and 3. The cooling system 60 includes a reservoir (not shown) situated in the frame 62 below the retraction engine 23. A pump, generally indicated at 63, is driven continuously by the retraction engine 23 and circulates coolant through the cooling system 60. The drum 27 is hollow and is divided by a central partition 65 into two longitudinally extending coolant chambers 66, 67. A plurality of circumferentially spaced, radially extending ports 68 open from the chamber 67 into the brake chamber 32 at one end. A second arrangement of ports 69 of slightly larger diameter than ports 68 provide a return from the brake chamber 32 at the opposite end into the coolant chamber 66. Coolant from the reservoir is brought by the pump 63 to the chamber 67 by delivery line 70 connected at one end of the drum 27. Under pressure, the coolant flows from chamber 67 through the ports 68 completely submerging the brake 35 and returning through ports 69 to chamber 66 and then flowing out the end of the drum 27 through return line 73 and back to the reservoir. Due to the difference in size of openings 68 and 69, chamber 67 will be at a slightly higher pressure than chamber 66 to insure that the circulation around the stators 45 and rotors 48 is from left to right as viewed in FIGURE 3. Some radial flow of coolant also may occur due to the centrifugal action of the reel. The coolant may be any suitable liquid such as water.

During arrestment of an aircraft, the retraction engine 23 is disengaged from the drive pinion 73 and reel drive gear 75. After the aircraft is brought to rest and in order to recover the system for a second arrestment, the engine 23 is clutched in to drive the pinion 73 recycling the reel 18. The aircraft runout may be in the order of 600 to 1000 feet and, as a result, the recycle time becomes a considerable factor in determining the number of arrestments which can be performed in a given period. For example, conventional rotary friction brake arresting engines have a total cycle time for both arrestment and rewind of about ten minutes, eight minutes of which is rewind time. Since most of the cooling of the brake occurs during the rewind period, it is difficult to shorten the rewind period and still satisfactorily cool the brake in such prior art apparatus.

In contrast, the main novel feature of the present invention is to permit rapid cycle operation in which the total cycle time including arrestment and rewind is in the order of one minute, forty seconds of which is rewind time. The decrease in the arresting time is attributable to the increased braking energy which stops the aircraft with a shorter runout. But more significantly, the rewind time is decreased due to the more efficient cooling system 60 employed which permits the use of a larger retraction engine for rewinding the tapes quickly. Since coolant is continuously circulated through the brake, the temperature never gets as high during the arrestment period as in conventional brakes. Also, the cooling rate during rewind is much faster and permits the brake to be restored to satisfactory operating temperature within a very short time. In addition, brake life is increased substantially. For example, with prior friction brake arrangements, a minimum of 150 engagements was permissible while with the present invention upwards of 800 engagements may be performed before the brakes need to be relined or overhauled.

Figure 6:
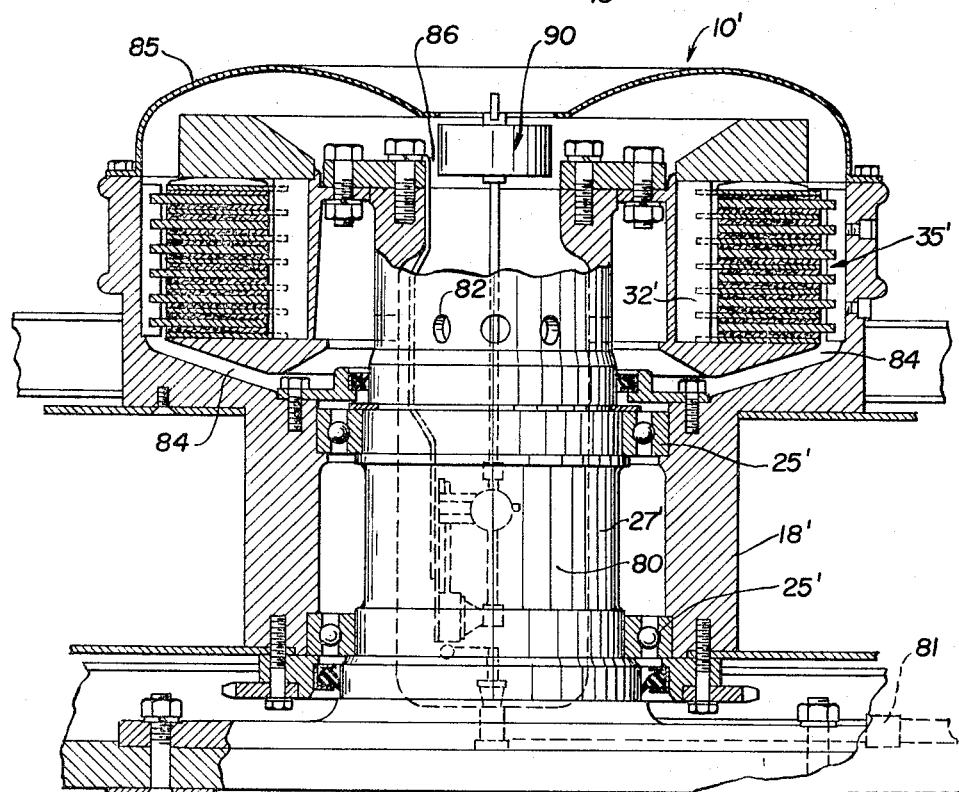
FIGURE 6 is a modification of the invention in which the payout pendant reel is mounted for rotation about a vertical axis.

A modification of the invention is shown in FIGURE 6 where similar parts are identified with like numerals with the addition of a prime mark. In the modified arresting engine 10' the reel 18' is mounted for rotation about a vertical axis upon a drum 27' on bearings 25'. The drum 27' is hollow defining a coolant reservoir 80 which is filled with a coolant such as water. During operation, the water enters the brake chamber 32' by flowing radially through ports 82 in the drum and passages 84 in the reel 18' under the centrifugal action of the rotating reel. A dome 85 mounted on the upper end of the reel 18' recirculates the water back to the reservoir 80 by deflecting it down the center hub 86 of the drum 27'. The rotary friction brake 35' is maintained submerged in the coolant by a simple float assembly 90 which keeps the water level in the reservoir 80 at the proper height. The centrifuging action of the reel 18' causes upward circulation through the brake and eliminates the need for a separate water pump.

It should be understood that the arresting engines 10, 10' described herein may be adapted for bidirectional arrestment of aircraft; or in the case of aircraft not equipped with a tail hook, may be attached to a barricade net as is common practice; or rather than being secured by earth anchors in an expeditionary type of installation, may be permanently mounted or installed in concrete bunkers below ground level. Other arrangements and modifications may be envisioned, however, insofar as they are based upon the teachings of the present invention, they are intended to be covered by the scope of the appended claims.

We claim:

1. In combination with a rotary pay-out reel aircraft arresting gear having a purchase tape wound thereon which is pulled by the aircraft and unwound from the reel during arrestment,
   a friction brake for retarding reel rotation during arrestment and
   a recirculating cooling system therefor to permit rapid rewinding of the tape,
   said brake comprising a rotatable tubular hub upon which the tape and reel are mounted,
   a nonrotatable mounting drum rotatably supporting the hub in radially spaced relationship so as to define an annular brake chamber therebetween,
   rotary sealing means between the hub and drum for sealing said brake chamber,
   a plurality of friction stator discs attached to the drum,
   a plurality of friction rotor discs attached to the hub and interleaved with the stator discs on the drum and
   fluid actuator means for urging the discs in rotary braking engagement and wherein
   said recirculating cooling system comprises
   a reservoir of liquid coolant,
   a coolant passageway from the reservoir to the brake chamber,
   a return coolant passageway from the brake chamber to the reservoir and
   means causing recirculation of the coolant to and from the brake chamber through said passageway so as to flow in intimate contact with said friction discs whereby a rapid succession of arrestments can take place without overheating the brake.

2. The combination according to claim 1 wherein the hub is rotatably mounted upon a horizontal axis and said drum is hollow and symmetrically divided into two coolant chambers defining said reservoir, one being at greater pressure than the other so as to cause positive coolant flow through the brake chamber.

3. The combination according to claim 2 wherein said hub comprises a pair of annular side plates, one at each end thereof for rotatably supporting the hub and defining with the hub and drum said annular brake chamber.

4. The combination according to claim 3 wherein the friction discs are sufficiently numerous to substantially fill said braking chamber from one side plate to the other and said fluid actuator means are disposed in aligned opposing relationship on opposite sides thereof so that the braking forces are opposite and equal producing a neutral zone substantially at the center of the brake chamber.

5. The combination according to claim 4 wherein a fixed ring member attached to the drum extends radially into the brake chamber approximately at the midpoint thereof.

6. The combination according to claim 1 wherein said drum extends vertically and the hub is rotatably mounted thereon about a vertical axis.

7. The combination according to claim 6 in which said drum is hollow and open at the upper end and the coolant passageway is from the interior of the drum to the brake chamber and comprises a plurality of radial ports in the drum spaced below said open end and the return coolant passageway from the brake chamber terminates above said open end whereby circulation of coolant is radially outwardly and upwardly through the brake chamber under the influence of the centrifugal force caused by rotation of said reel.

8. The combination according to claim 7 wherein said return passageway is formed, in part, by an annular member attached to the upper end of said hub curving radially inwardly and downwardly toward the open end of said drum so as to direct coolant flow back into the reservoir.

References Cited by the Examiner

UNITED STATES PATENTS

| 2,955,678 | 10/1960 | Schjolin et al. | 188—72 |
| 2,966,966 | 1/1961 | Eames | 188—72 |

OTHER REFERENCES

Aviation Week, Sept. 23, 1957 (pages 86, 87, 89, 91, 93, 95, 97, 99).

Aircraft Engineering, November 1961 (page 335).

MILTON BUCHLER, *Primary Examiner.*

LARRY C. HALL, FERGUS S. MIDDLETON,
                                                *Examiners.*

P. F. SAUBERER, *Assistant Examiner.*